United States Patent
Kramer et al.

(10) Patent No.: US 11,846,938 B2
(45) Date of Patent: Dec. 19, 2023

(54) REMOTE-CONTROLLED PARKING ASSISTANCE SYSTEM WITH AUTONOMOUS DECISION ABOUT THE PRESENCE OF A PARKING OR PARKING-SPACE-EXITING SITUATION AND CORRESPONDING PARKING METHOD

(71) Applicant: Bayerische Motoren Werke Aktiengesellschaft, Munich (DE)

(72) Inventors: Martin Kramer, Munich (DE); Tobias Strobel, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 651 days.

(21) Appl. No.: 16/969,376

(22) PCT Filed: Feb. 18, 2019

(86) PCT No.: PCT/DE2019/100151
§ 371 (c)(1),
(2) Date: Aug. 12, 2020

(87) PCT Pub. No.: WO2019/161841
PCT Pub. Date: Aug. 29, 2019

(65) Prior Publication Data
US 2020/0401127 A1 Dec. 24, 2020

(30) Foreign Application Priority Data
Feb. 23, 2018 (DE) ...................... 10 2018 202 738.2

(51) Int. Cl.
*G05D 1/00* (2006.01)
*B62D 15/02* (2006.01)
*G08G 1/14* (2006.01)

(52) U.S. Cl.
CPC ....... *G05D 1/0011* (2013.01); *B62D 15/0285* (2013.01); *G05D 1/0088* (2013.01); *G08G 1/144* (2013.01)

(58) Field of Classification Search
CPC .............. G05D 1/0011; G05D 1/0088; B62D 15/0285; G08G 1/144
See application file for complete search history.

(56) References Cited

U.S. PATENT DOCUMENTS

2002/0157889 A1 10/2002 Mackle et al.
2013/0073119 A1 3/2013 Huger et al.
(Continued)

FOREIGN PATENT DOCUMENTS

CN 101678860 A 3/2010
CN 103079935 A 5/2013
(Continued)

OTHER PUBLICATIONS

International Search Report (PCT/ISA/210) issued in PCT Application No. PCT/DE2019/100151 dated May 27, 2019 with English translation (six (6) pages).

(Continued)

Primary Examiner — Michael J Zanelli
(74) Attorney, Agent, or Firm — Crowell & Moring LLP (57) ABSTRACT

A parking assistance system is remote-controlled for automated parking and exiting from a parking space. The parking assistance system has a receiver for receiving a movement direction of the vehicle selected by the user. A control device which is coupled to the receiver is configured to decide independently, without the user making any specification about the presence of a parking situation or parking-space-exiting situation, whether there is a parking situation or parking-space-exiting situation. If the control device decides that the parking situation is present, the vehicle is (Continued)

parked in the parking space in accordance with the received selected movement direction by forward driving or driving in reverse. Otherwise, if the control device decides that the parking-space-exiting situation is present, the vehicle is made to exit the parking space in accordance with the received selected movement direction by forward driving or driving in reverse.

16 Claims, 4 Drawing Sheets

(56) References Cited

U.S. PATENT DOCUMENTS

| | | | |
|---|---|---|---|
| 2014/0222252 A1 | 8/2014 | Matters et al. | |
| 2015/0203111 A1 | 7/2015 | Bonnet et al. | |
| 2018/0039264 A1 | 2/2018 | Messner et al. | |

FOREIGN PATENT DOCUMENTS

| | | | | |
|---|---|---|---|---|
| CN | 104520170 A | 4/2015 | | |
| CN | 106985815 A | 7/2017 | | |
| DE | 198 17 142 A1 | 10/1999 | | |
| DE | 101 17 651 A1 | 10/2002 | | |
| DE | 10 2008 019 346 A1 | 9/2009 | | |
| DE | 10 2009 057 646 A1 | 6/2011 | | |
| DE | 10 2012 200 625 A1 | 7/2013 | | |
| DE | 10 2014 211 548 A1 | 12/2015 | | |
| DE | 10 2015 208 123 A1 | 10/2016 | | |
| DE | 10 2015 208 124 A1 | 10/2016 | | |
| DE | 10 2016 111 878 A1 | 1/2018 | | |
| DE | 102017215565 A1 * | 3/2018 | ............. | B60R 16/02 |
| JP | 2006044484 A * | 2/2006 | ........... | B62D 15/027 |
| WO | WO 2013/053776 A2 | 4/2013 | | |
| WO | WO 2016/166086 A1 | 10/2016 | | |

OTHER PUBLICATIONS

German-language Written Opinion (PCT/ISA/237) issued in PCT Application No. PCT/DE2019/100151 dated May 27, 2019 (six (6) pages).

German-language Search Report issued in German Application No. 10 2018 202 738.2 dated Oct. 18, 2018 with partial English translation (13 pages).

International Preliminary Report on Patentability (PCT/IB/373) issued in PCT Application No. PCT/DE2019/100151 dated Aug. 27, 2020, including English translation of document C2 (Japanese-language Written Opinion (PCT/ISA/237) previously filed on Aug. 12, 2020) (seven (7) pages).

Chinese-language Office Action issued in Chinese Application No. 201980012458.X dated Feb. 16, 2022 with English translation (15 pages).

* cited by examiner

REMOTE-CONTROLLED PARKING ASSISTANCE SYSTEM WITH AUTONOMOUS DECISION ABOUT THE PRESENCE OF A PARKING OR PARKING-SPACE-EXITING SITUATION AND CORRESPONDING PARKING METHOD

BACKGROUND AND SUMMARY OF THE INVENTION

The invention relates to a parking assistance system which can be remote-controlled from outside a motor vehicle and has a remote-controlled parking function for the automated parking in and exiting from a parking space as well as a corresponding parking method.

Various types of parking assistance systems are known: simple parking assistants comprise a surroundings sensor system, for example an ultrasonic sensor system, for detecting obstacles, wherein the distance from the detected obstacle is communicated to the driver in an optical and/or acoustic fashion. Furthermore, parking assistance systems with automated lateral guidance are known which relieve the driver of the driving function of steering during parking and steer the vehicle along a calculated parking trajectory into a parallel parking space or a transverse parking space, wherein the driver continues to activate the brake pedal and accelerator pedal. Furthermore, parking assistance systems with automated transverse guidance and longitudinal guidance are known which additionally also control the drive and the brakes. The parking assistance system carries out here the driving functions as long as the driver activates a pushbutton key in the vehicle. By means of the pushbutton key in the vehicle, the driver exerts control over the parking process. With these parking assistants the driver remains in the driver's seat. However, parking assistance systems are known, for example for parallel parking places which can be parked in the forward direction or the reverse direction (e.g. in a single garage) and in which the driver is located outside the vehicle during the parking process. The control of the parking process is switched to a remote control system here.

Documents WO 2013/053776 A2, DE 10 2015 208 123 A1 and DE 10 2015 208 124 A1 describe parking assistance systems which can be remote-controlled by a remote control system and have the purpose of automated parking into a forward parking space (in particular a single garage), wherein the remote control system comprises an operator control element for controlling the forward driving and an operator control element for controlling the reverse driving. When the vehicle has been stopped before the parking space, the operator can steer the vehicle into the parking space from outside the vehicle by activating the control element to steer the forward driving.

The applicant supplies motor vehicles with the "remote-controlled parking" function which permits the driver to exit the vehicle comfortably and then park the vehicle under remote control in the forward direction into forward parking spaces e.g. a parking space which is bounded laterally or a garage and to exit the parking space in reverse. For remote-controlled parking, the vehicle has to be positioned with its front as far as possible in the center and just before a parking space or a garage. The remote-controlled parking function is actuated by the driver outside the vehicle using a display key. In order to start the parking process, an arrow symbol for forward driving is touched on the display. The vehicle is steered autonomously during the parking process. After the parking, the engine is switched off with the key and also started again when the vehicle is picked up. In the case of remote-controlled exiting from a parking space, the vehicle is moved in reverse in the straight-ahead direction out of the parking space. In order to start the parking-space-exiting process, the arrow symbol for the reverse parking is touched on the display or the vehicle symbol is dragged slowly to the rear.

With this function, the driver can generally specify the movement direction of the vehicle as desired as long as there is no obstacle in front of the vehicle. Forward travel which has been selected by remote control is always interpreted here as a parking process, and a parking space which is to be parked in is searched for in front of the vehicle. Reverse travel which is selected by remote control is always evaluated as a parking-space-exiting process and always takes place without a steering movement, i.e. in the straight-ahead direction.

Therefore, only parking in the forward parking direction is possible with the parking function, parking in the reverse parking direction is not possible. If the driver in fact wishes to carry out parking in the reverse direction, the parking maneuver generally cannot be carried out successfully since the vehicle always moves in an unsteered fashion in reverse.

The object of the present invention is to make available a parking assistance system which can be remote-controlled from the outside and a corresponding parking method which, depending on the position of the parking space, permits parking in the forward parking direction or reverse parking direction and corresponding exiting from a parking space, wherein the operator control is as simple as possible for the user despite the expanded functionality with the possibility of reverse parking (in addition to forward parking).

The object is achieved by means of the features of the independent patent claims. Advantageous embodiments are described in the dependent claims. It is to be noted that additional features of a dependent patent claim which is dependent on an independent patent claim can form, without the features of the independent patent claim or only in combination with a subset of the features of the independent patent claim, a separate invention which is independent of the combination of all the features of the independent patent claim and which can be made the subject matter of an independent claim, of a divisional application or of a subsequent application. This applies in the same way to the technical teachings which are described in the description and can form an invention which is independent of the features of the independent patent claims.

A first aspect of the invention relates to a parking assistance system which can be remote-controlled from outside a motor vehicle, in particular a car, and has a remote-controlled parking function for automated parking in and exiting from a parking space, with at least automated longitudinal guidance. The term parking space is understood to mean an area for parking a vehicle inside or outside the public traffic areas. The parking space is preferably a forward parking space (e.g. a single garage, a double garage or parking space which is bounded laterally by vehicles), in front of which the vehicle is positioned with its front or its rear before the parking process so that the vehicle can then park in the parking space in the forward parking direction or reverse parking direction during the automated parking process. It would also be conceivable to use the invention to park in a transverse parking space (e.g. a transverse parking space which is bounded laterally by two vehicles), wherein the vehicle is oriented essentially perpendicularly with respect to the transverse parking space before parking occurs.

However, it would be basically also conceivable to use the invention in a parking assistance system for parking in parallel parking spaces.

The parking assistance system permits, depending on the position of the parking space in respect of the vehicle in question—parking in the forward parking direction or reverse parking direction, i.e. the parking assistance system assists both forward parking and reverse parking.

The parking assistance system preferably permits steered parking into a forward parking space both in the case of forward parking and of reverse parking, wherein, for example a certain lateral offset between the vehicle and the parking space and/or a certain angle between the orientation of the vehicle and the orientation of the parking space during the parking process can be compensated by steering.

The parking assistance system comprises a receiver device for receiving a movement direction, selected at the user end, of the vehicle. The information about the selected movement direction preferably originates from a remote control system which communicates, for example, by radio with the vehicle, for example, additionally or also serves as a radio key for locking and unlocking the vehicle. However, it would also be conceivable that the receiver device is an optical or acoustic receiver device with which optical control gestures or acoustic control commands of the user can be detected without the user having to operate a physical remote control system in order to operate the parking assistance system.

Depending on the user's selection, the receiver device can receive as a movement direction (selected by the user) a selected forward-driving movement direction for driving the vehicle forward or a reverse-driving movement direction for driving the vehicle in reverse.

In addition, a control device which is coupled to the receiver device is provided, the control device being configured to decide autonomously, without user-side specification, about the presence of a parking situation or parking-space-exiting situation, whether a parking situation or a parking-space-exiting situation is present. For example, for this a decision logic is used into which one or more parameters (in particular the information about the selected movement direction) are input in order to decide about the presence of a parking situation or parking-space-exiting situation. The decision about the presence of a parking situation or parking-space-exiting situation can already take place before the start of the parking process, at the start of the parking process and/or after the start of the parking process, depending on the implementation. For example, the decision about the presence of the parking situation or parking-space-exiting situation after the activation of the parking function does not take place until after the reception of the information about the selected movement direction and movement of the vehicle over a certain movement distance in the selected movement direction. In this case, the parking process which has already been started is therefore detected, i.e. it is detected whether a parking process or a parking-space-exiting process is present.

If the control device detects the presence of a parking situation, the vehicle is parked into the parking space by forward driving or reverse driving in accordance with the received selected movement direction, preferably in a vehicle movement which is steered according to requirements. If, on the other hand, the control device detects the presence of a parking-space-exiting situation, the vehicle is exited from the parking space in accordance with the received desired movement direction by forward movement or reverse movement out of the parking space. The exiting from the parking space always takes place, for example, in an unsteered fashion. However, it would also be conceivable that given a different implementation, the exiting from the parking space is, when necessary, also carried out in a steered fashion, for example in order to place the vehicle in a position parallel to the lateral boundary of the parking space during the exiting from the parking space or, for example, to move the vehicle out of what is referred to as a crocked garage in which it is necessary to steer after entry so that when exiting the parking space the garage can no longer be exited in an unsteered fashion. The type of parking situation (parking situation or parking-space-exiting situation) therefore preferably influences the steering behavior, wherein for example when the presence of a parking situation is detected, the vehicle is parked in the steered fashion into a parking space which is detected with a surroundings sensor system, and when the presence of a parking-space-exiting maneuver is detected the vehicle is exited from a parking space in unsteered fashion.

The parking assistance system is therefore expanded in comparison with known parking assistance systems in such a way that the actual parking assistance system detects the type of parking situation (specifically parking in or exiting from parking spaces) without a further operator control input for selecting the parking situation being necessary for this. The user can therefore park in or exit from a parking space (e.g. a laterally bounded parking space or a garage) in the forward direction and in reverse without being irritated by an additional selection step in the display operator control concept.

The decision about the type of parking situation is advantageously made taking into account the selected movement direction and/or on the basis of the parking position of the vehicle, for example by means of a decision logic. For example, the system decides whether a parking process or parking-space-exiting process is present autonomously on the basis of the parking position of the vehicle and the selected movement direction.

The control device of the parking assistance system is preferably configured to detect a change in position of the vehicle with respect to a parking position of the vehicle into which the vehicle was parked without using the remote-controlled parking function (and in which the driver has exited the vehicle). On the basis of the detected change in position and the received selected movement direction, the control device can decide autonomously (i.e. without selection by the user) whether a parking situation or a parking-space-exiting situation is present.

It is advantageous if a position-determining device for determining the vehicle position of the motor vehicle is provided, so that the vehicle position during or after the parking of the motor vehicle can be specified and stored as the parking position of the vehicle. A change in position can then be detected on the basis of the stored parking position and the current vehicle position. However, it is not compulsory to determine the position. For example, it would be conceivable to check whether the vehicle has still been moved after the vehicle has been parked using the remote-controlled parking assistance function, without the parking position and the later vehicle position actually being known to the system or being evaluated by the system for this purpose.

However, it would also be conceivable to define the vehicle position directly when the vehicle is exited (or shortly beforehand when the engine is switched off) as a parking position and store it if appropriate. The vehicle position is, however, preferably specified as a parking position and preferably stored when the remote-controlled parking function is activated, before the start of the parking maneuver.

It is advantageous not to define and store the vehicle position as a parking position when the remote-controlled parking function is activated, before the start of the parking maneuver, if a valid parking position is already present.

If the control device detects that the vehicle has moved without using the remote-controlled parking function, the previous parking position is preferably rejected, for example deleted, reset or marked as invalid, in response thereto.

For example the presence of a parking situation is detected at the system end if it is detected that a change in position with respect to the parking position is present in the forward direction (i.e. the new position of the vehicle is located before the parking position) and a selected forward-movement direction of movement is present. A parking situation is also present if it is detected that a change in position is present in comparison with the parking position in the reverse direction (i.e. the new position of the vehicle is located after the parking position) and a selected reverse-driving movement direction is present.

On the other hand, it is detected at the system end that a parking-space-exiting position is present if it is detected that a change in position is present in comparison with the parking position in the forward direction and a selected reverse-driving movement direction. A parking-space-exiting situation is also present if it is detected that a change in position is present in comparison with the parking position in the reverse direction and a selected forward-driving movement direction.

In order to determine the change in position it is, for example, checked whether the vehicle is located in a front or rear position region with respect to a specific reference point (e.g. the center of the rear axle). The front and rear position regions are delimited from one another by a discrimination straight line (or switching line). The discrimination straight line runs through the position of the reference point in the parking position and is oriented transverse with respect to the vehicle orientation in the parking position. If the reference point of the vehicle lies before the discrimination straight line when viewed in the direction of the vehicle, the vehicle is located in the front position region. If, on the other hand, the reference point of the vehicle lies after the discrimination straight line when viewed in the direction of the vehicle, the vehicle is located in the rear position region.

The decision logic for detecting a parking situation and/or parking-space-exiting situation provides, for example, that a parking situation is detected if it is detected that the vehicle is located in the front position region and a selected forward-driving movement direction is present, or if it is detected that the vehicle is located in a rear position region and a selected reverse-driving movement direction is present. The decision logic provides, for example, on the other hand, that a parking-space-exiting situation is present if it is detected that the vehicle is located in a front position region and a reverse-driving movement direction is present, or if it is detected that the vehicle is located in a rear position region and a forward-driving movement direction is present.

The procedure described above relating to the system-end decision about the presence of a parking situation or a parking-space-exiting situation on the basis of a change in position with respect to a parking position is not compulsory.

It would be conceivable that on the basis of surroundings information of the surroundings sensor system the presence of a narrow point (e.g. narrow parking space or garage) around the vehicle is detected and this information is taken into account (in particular additionally taking into account the selected movement direction) in order to evaluate the parking maneuver as a parking-space-exiting maneuver (and therefore not as a parking maneuver). The surroundings sensor system comprises, for example, an ultrasonic sensor system and/or a camera sensor system.

If the parking space is, for example, a forward parking space (e.g. a single garage or a parking space which is bounded laterally by vehicles), for example the presence of a narrow point can be detected on the basis of surroundings information about the presence of at least one obstacle to the side of the vehicle.

In the case of a garage (e.g. single or double garage), for example the presence of an obstacle at least to the side of the vehicle and in front of the vehicle (in the case of exiting from a parking space in reverse) or at least to the side of the vehicle and behind the vehicle (in the case of forward exiting from a parking space), can be checked, in order to decide that a narrow point is present and that a parking-space-exiting situation is present. Alternatively or additionally it would be conceivable to check for the presence of an obstacle on both sides of the vehicle in order to detect the presence of a narrow point in the case of a single garage or a parking space with a lateral boundary, and therefore to infer the presence of a parking-space-exiting situation.

A second aspect of the invention relates to a parking method for automated parking into and exiting from a parking space, wherein parking can be carried out in the forward parking direction or in the reverse parking direction depending on the position of the parking space. The method comprises the following steps:

receiving a movement direction, selected at the user end, of the vehicle from outside the vehicle, wherein it is possible to receive as a selected movement direction:
a forward-driving movement direction for driving the vehicle forward and
a reverse-driving movement direction for driving the vehicle in reverse, and
without user-end specification about the presence of a parking situation or parking-space-exiting situation, deciding autonomously as to whether there is a parking situation or a parking-space-exiting situation,
when the presence of a parking situation is detected, parking the vehicle in accordance with the received selected movement direction by forward movement or reverse movement into the parking space, and
when the presence of a parking-space-exiting situation is detected, moving the vehicle out of the parking space in accordance with the received selected movement direction by forward movement or reverse movement out of the parking space.

The statements above relating to the inventive parking assistance system according to the first aspect of the invention also apply in a corresponding way to the inventive parking method according to the second aspect of the invention. At this point, and in the patent claims, advantageous exemplary embodiments of the method according to the invention which are not explicitly described correspond to the advantageous exemplary embodiments of the inventive parking assistance system which are described above or described in the patent claims.

The invention is described below on the basis of an exemplary embodiment using the appended drawings.

DETAILED DESCRIPTION OF THE DRAWINGS

Figure 1:
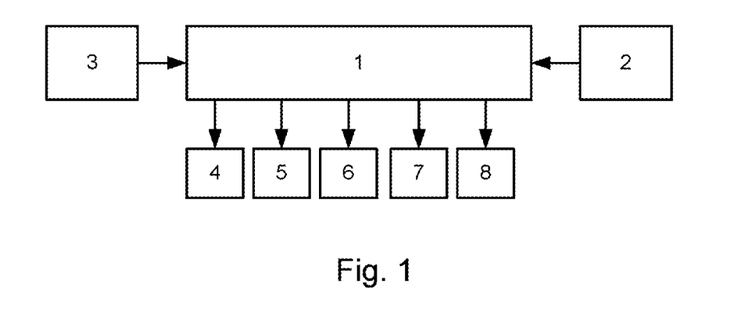
FIG. 1 is an exemplary simplified block diagram of an exemplary embodiment of an inventive parking assistance system.

FIG. 1 illustrates an exemplary simplified block diagram of an exemplary embodiment of an inventive parking assistance system which can be remote-controlled from outside the vehicle by means of a remote control system.

By means of the remote control system it is possible for the driver to select as the movement direction, for example, forward driving by means of a forward-driving operator control element and reverse driving by means of a reverse-driving operator control element, wherein the operator control elements are, for example, each implemented as a pushbutton key or are each displayed as a virtual pushbutton key on a touch-sensitive display. In another operator control concept, the user-end selection of the movement direction can also be made by means of the selected direction (in the clockwise direction or counter-clockwise direction) of a circular movement on a touch-sensitive operator control interface, in particular a touch-sensitive screen. If the user no longer selects a movement direction, the vehicle stops. The vehicle also stops if the distance of the vehicle from an obstacle drops below a certain value.

The exemplary parking assistance system comprises a receiver device 3 for receiving the movement direction selected by the user and for communicating it to an electronic control device 1 which is coupled to the receiver device.

The control device 1 is also coupled to a position-determining device 2 by means of which the vehicle position can be determined and which communicates the determined vehicle position to the control device 1.

In addition, the control device 1 serves to control the drive 4, the steering system 5, the service brake 6, the transmission 7 and the parking brake 8. If appropriate, these units are coupled via further control devices (not illustrated) to the control device 1 of the parking assistance system.

Figure 2:
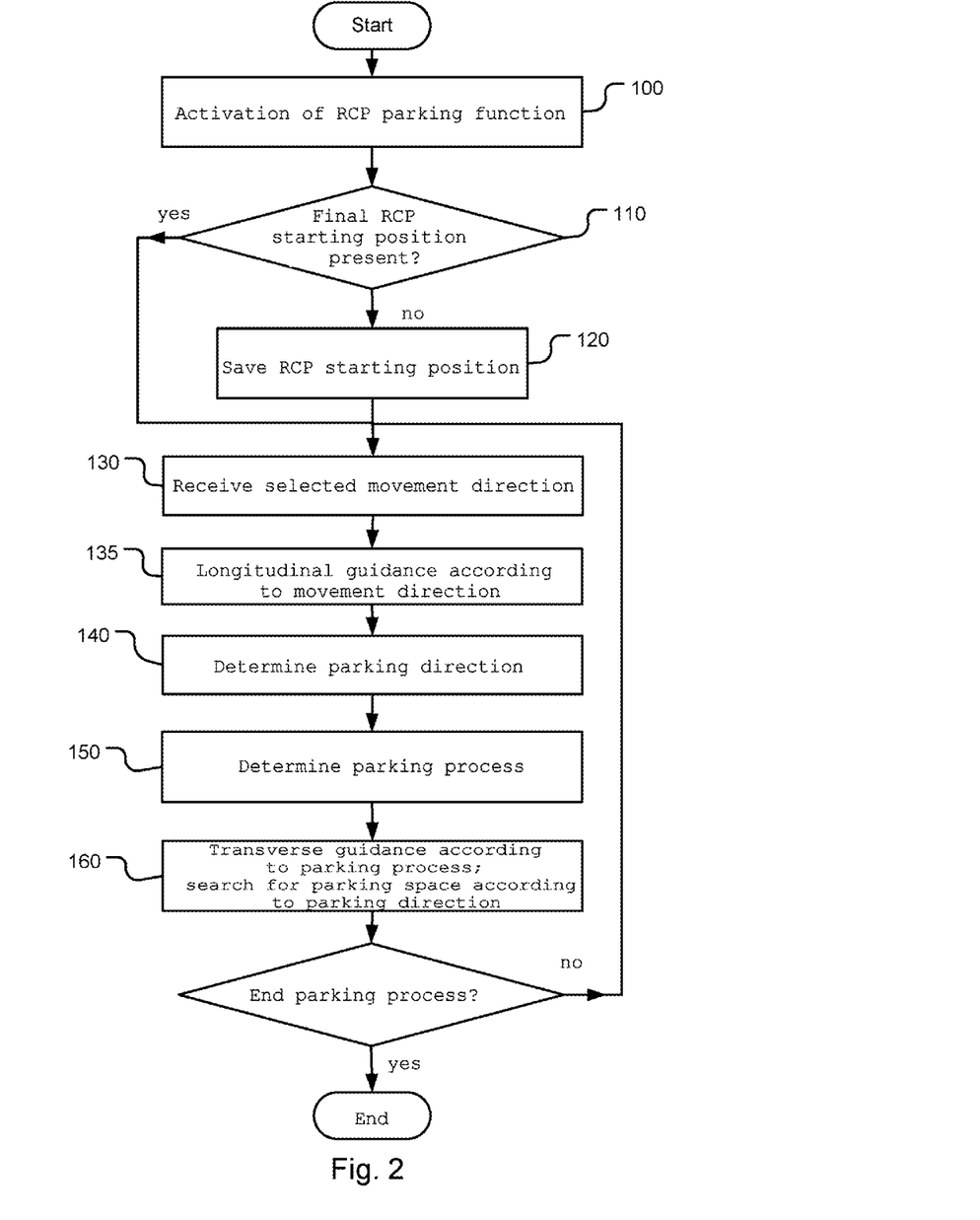
FIG. 2 is an exemplary simplified flow diagram relating to the method of functioning of an exemplary embodiment of an inventive parking assistance system.

FIG. 2 illustrates an exemplary flow diagram relating to the method of functioning of an exemplary embodiment of a parking assistance system for remote-controlled parking.

The user selects, by means of the remote control system, only the movement direction (forward or in reverse) as input for the RCP (remote controlled parking) function; the RCP function decides autonomously whether it is a parking process or parking-space-exiting process. For this purpose it includes the starting position of the vehicle in the activation of the RCP function. This corresponds to the parking position of the vehicle.

If the parking function RCP is activated (see step 100), it is checked whether a valid RCP starting position is already present (see interrogation 110). If this is already present, it must be retained.

The RCP starting position is, for example, the odometry position (x, y coordinates and orientation) during the activation of the RCP function. This is obtained from the position-determining device 2.

The RCP starting position is stored during the activation of the RCP function before the start of the method of the vehicle (step 120).

If the vehicle has been moved outside the RCP parking function, i.e. for example manually by the driver or by some other automated parking function (for example a non-remote-controlled parking function for automated parallel parking and transverse parking), the stored RCP starting position is rejected (not illustrated). During this implementation in this respect, a minimum movement distance must be exceeded, which distance is to be selected such that undesired rejection of the RCP starting position is avoided in the stationary state.

If the vehicle is made ready to drive or if the engine is started without the vehicle moving (movement distance smaller than the minimum movement distance), the RCP starting position is not reset.

The RCP starting position is persistently stored in step 120.

After the driver specifies the movement direction by means of the remote control and the information about this has been received via the receiver device 3 and the information has been made available to the control unit 1 (see step 130), the vehicle is incrementally moved in the direction of the selected movement direction in step 135.

On the basis of the selected movement direction and the change in position of the vehicle in comparison with the stored RCP starting position, it is possible to decide in step 140 whether a forward parking direction or reverse parking direction is present.

A distinction is made between the parking directions of forward parking direction and reverse parking direction. For this a discrimination straight line 10 (or switch-over straight line)—illustrated in FIG. 3—is used.

Figure 3:
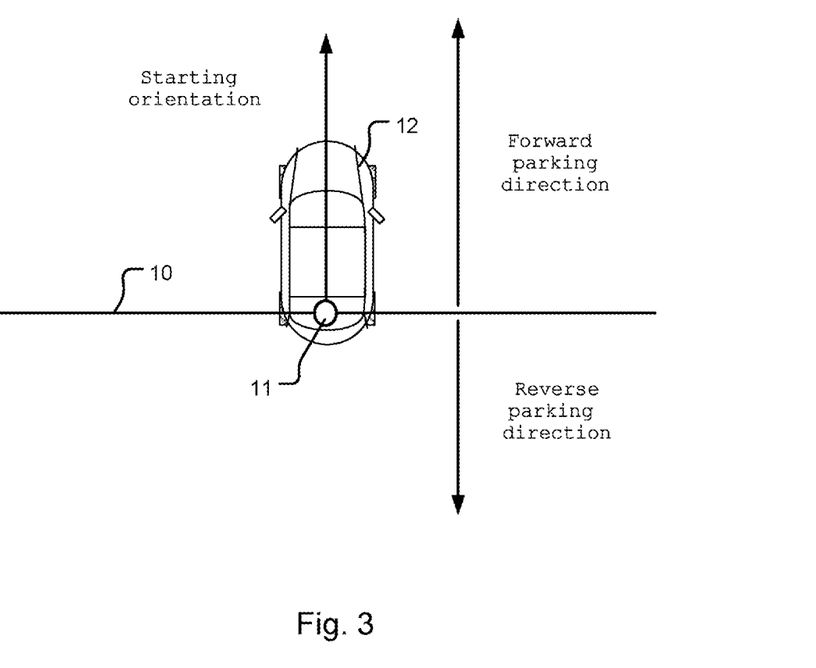
FIG. 3 is an exemplary definition of a discrimination straight line.

In FIG. 3, the illustrated vehicle 12 is in the parking position, i.e. in the RCP starting position.

The discrimination straight line 10 runs through the position of a reference point 11 (e.g. the center of the rear axle) of the vehicle 12 in the RCP starting position and is transverse to the vehicle orientation in the parking position.

The discrimination straight line 10 divides the parking area into two hemispheres. The northern hemisphere (also referred to as the front position region) is defined by the vehicle positions in which the vehicle reference point 11 (for example the center of the rear axle) lies above the discrimination straight line 10 in the direction of the vehicle (i.e. the reference point 11 of the vehicle 12 lies in front of the discrimination straight line 10 when viewed in the direction of the vehicle). In this region the parking direction is the forward parking direction.

The southern hemisphere (also referred to as the rear position region) is produced correspondingly by reference points at which the vehicle reference point 11 lies underneath the discrimination straight line 10 (i.e. the reference point 11 lies behind the discrimination straight line 10 when viewed in the direction of the vehicle). In this region the parking direction is the reverse parking direction.

The parking direction can change as desired during an RCP parking process through overshooting of the discrimination straight line 10.

For the changeover of the parking direction a hysteresis (not illustrated) is preferably provided. The hysteresis is preferably still not used during the RCP activation and when there a still unclear parking direction.

After the parking direction has been determined in step 140, the parking process, specifically whether parking or exiting from a parking space occurs, is determined in step 150.

The parking situation results from the combination of the current hemisphere (i.e. current parking direction) and the received selected movement direction of the user (i.e. the selection by the user on the remote control system):

The state of parking occurs if the vehicle 12 is located in the northern hemisphere (i.e. forward parking direction) and in a forward movement direction selected by the user, or is located in the southern hemisphere (i.e. reverse parking direction) and in a reverse movement direction selected by the user.

The parking-space-exiting state occurs if the vehicle 12 is located in the northern hemisphere (i.e. forward parking direction) and in a reverse movement direction selected by the user, or is located in the southern hemisphere (i.e. reverse parking direction) and in a forward movement direction selected by the user. These relationships with respect to the determination of the parking process are illustrated below in the Table 1.

TABLE 1

Determination of the parking process

| Movement direction | Hemisphere | |
|---|---|---|
| | Northern | Southern |
| Forward | Parking | Exiting parking space |
| Reverse | Exiting parking space | Parking |

Therefore, a distinction is made between the parking direction (forward parking direction or reverse parking direction) and the parking process (parking or exiting a parking space).

The searching direction for detecting a parking space in step 160 depends on the detected parking direction. When a parking direction for forward parking is detected, parking spaces are searched for in front of the vehicle, and when a parking direction for reverse parking is detected parking spaces are searched for behind the vehicle. The search for a parking space is preferably carried out only when a parking process for parking is detected, and in the case of exiting a parking space a parking space is then not searched for.

However, it would be conceivable in the case of exiting a parking space to search for an object with which the vehicle orientates itself. In this case, an object would preferably be searched for in front of the vehicle in the case of exiting a parking space in a detected parking direction for forward parking, while in the case of a detected parking direction for reverse parking an object behind the vehicle is searched for.

The parking process influences the steering behavior of the vehicle in step 160. In the case of a detected parking process for parking, the vehicle is parked in a steered fashion into a detected parking space. In the case of a detected parking process for exiting from a parking space, the vehicle is moved in an unsteered fashion.

Various system states will be described below with reference to FIG. 4.

Figure 4:
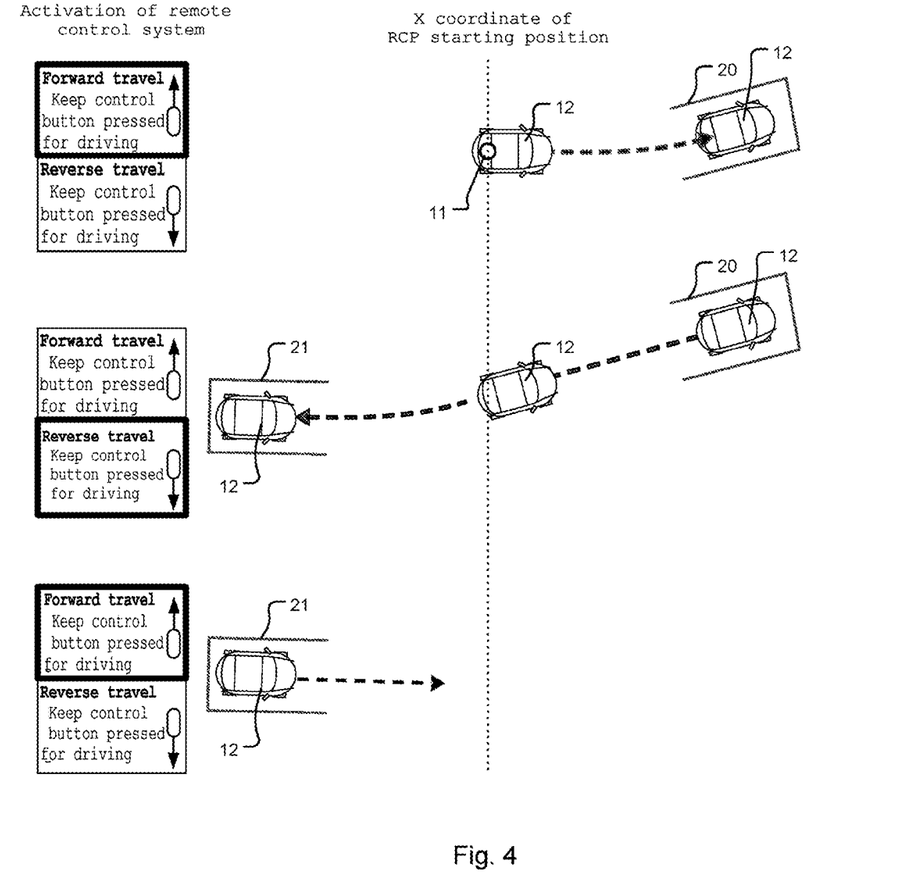
FIG. 4 shows exemplary use situations.

The user initially parks his vehicle 12 in front of the forward parking space 20, wherein the reference point 11 of the vehicle 12 lies on the parking position (=RCP starting position), as is illustrated top center in FIG. 4. At this time, the parking direction and the parking process are still undefined.

Then, the RCP parking function is activated, the RCP starting position is stored and then the vehicle is moved forward by activating an operator control element for forward travel (for example by touching an operator control interface on a touch-sensitive display of the remote control), wherein when the parking area 20 is detected the vehicle 12 is parked in a steered fashion in the direction of the parking space 20. After the movement of the vehicle 12, the vehicle 12 is located in the northern hemisphere, and the parking direction is therefore forward parking and the parking process is parking.

The user then corrects, for example, the position by moving the vehicle in reverse by activating the assigned operating control element, but not back as far as the starting position. During this reverse travel, the parking direction continues to be forward parking, since the vehicle 12 is located in the northern hemisphere. However, since the movement direction is reverse movement, the parking process is then exiting from a parking space.

The user then moves the vehicle 12 forward again as far as the final parking position in the parking space 20, which is illustrated top right in FIG. 4. During this forward travel, the parking direction is forward parking, and the parking process corresponds to parking.

The vehicle 12 which is parked in the parking space 20 is to be exited later from the parking space 20 in reverse, as is illustrated center right in FIG. 4. For this purpose, the RCP parking function is activated anew. Since a valid RCP starting position has already been stored before the parking, when the RCP parking function is activated a new RCP starting position is not stored. The vehicle 12 is moved in reverse out of the parking space 20 by activating the operator control element for reverse travel, but without already reaching the RCP starting position which was stored earlier. Since the vehicle is located in the northern hemisphere, the parking direction is firstly still forward parking, wherein the parking assistance system detects the parking process of exiting from a parking space. Since the presence of the state of exiting from a parking space is detected, the parking space is exited in an unsteered fashion.

If the vehicle 12 is then moved further by corresponding activation of the operator control element for reverse travel, and if the vehicle 12 goes beyond the discrimination line 10, the detected parking direction changes into reverse parking, and the detected parking process changes into parking.

If the user then corrects the position later in that the user moves the vehicle 12 forward by activating the operator control element for forward travel, the parking direction for reverse parking is retained as long as the vehicle 12 is not moved again as far as the RCP starting position. The system detects that parking is present.

If the user subsequently moves the vehicle in reverse again by activating the operator control element for reverse travel, the system detects that reverse parking continues to be present as the parking direction and that parking is present as the parking process. If a parking space 21 is detected behind the vehicle 12 when the parking state is detected, the vehicle 12 parks in reverse in a steered fashion into the parking space 21 as far as the final parking position, as is illustrated center left in FIG. 4. The RCP parking function is then ended.

If later the vehicle 12 is then to be exited again from the parking space 21 with the forward parking function, the RCP parking function is activated without a new RCP starting position being stored, and then vehicle 12 is moved forward by activating the operator control element for forward travel, and in the process the vehicle is actually made to exit the parking space 21.

The above description is summarized in Table 2 with the detected states for the parking direction and the parking process.

If the user parks the vehicle 12 manually into a parking space and later would like to exit the parking space with the RCP parking function, an RCP starting position is defined when the RCP parking function is activated, and a new discrimination line 10 is defined. According to the decision logic described above, the system is then in the detected state of parking. However, since, depending on the parking direction, a parking space is not detected in front of or behind the vehicle, the vehicle is made to exit the parking space in an unsteered fashion.

TABLE 2

Parking direction and parking process in various use situations

| Description | Parking direction | Parking process |
|---|---|---|
| User parks his vehicle in front of the parking space | — | — |
| RCP is activated and the vehicle is moved forward. | Forward | Parking |
| The user corrects the parking position by moving in reverse, but does not drive back as far as the starting position. | Forward | Exiting parking space |
| The user moves forward again as far as the final parking position and ends RCP. | Forward | Parking |
| RCP is activated anew and the vehicle is moved in reverse out of the parking space without reaching the starting position. | Forward | Exiting parking space |
| RCP is moved further in reverse, and the vehicle moves beyond the switch-over line. | In reverse | Parking |
| The user corrects the parking position by moving forward, but does not move back as far as the starting position. | In reverse | Exiting parking space |
| The user moves in reverse again as far as the final parking position and ends RCP. | In reverse | Parking |

What is claimed is:

1. A parking assistance system which is remote-controllable from outside a motor vehicle and has a remote-controlled parking function for automated parking in and exiting from a parking space, which system permits parking in a forward parking direction or in a reverse parking direction depending on a position of a parking space, wherein the parking assistance system comprises:
   a receiver for receiving a movement direction of the vehicle, selected at a user end, wherein it is possible to receive as a selected movement direction:
      (i) a forward-driving movement direction for driving the vehicle forward and
      (ii) a reverse-driving movement direction for driving the vehicle in reverse; and
   a control device which is coupled to the receiver and is configured to:
      decide independently, without user-end specification about the presence of a parking situation or parking-space-exiting situation, whether a parking situation or a parking-space-exiting situation is present,
      in response to deciding that the parking situation is present, park the vehicle in accordance with the received selected movement direction by forward driving or driving in reverse into the parking space, and
      in response to deciding that the parking-space-exiting situation is present, make the vehicle exit the parking space in accordance with the received selected movement direction by way of forward movement or movement in reverse.

2. The parking assistance system according to claim 1, wherein the control device is configured to:
   detect a change in position of the vehicle with respect to a parking position of the vehicle in which the vehicle has been parked without using the remote-controlled parking function, and
   decide autonomously on the basis of the detected change in position and the received selected movement direction, whether a parking situation or a parking-space-exiting situation is present.

3. The parking assistance system according to claim 2, wherein the parking assistance system further comprises:
   a position-determining device for determining the vehicle position of the motor vehicle, and
   wherein the control device is coupled to the position-determining device in order to receive the determined vehicle position, and is configured to:
   specify as the parking position of the vehicle, the vehicle position which is present when or after the vehicle is parked, and
   detect a change in position on the basis of the specified parking position and the current vehicle position.

4. The parking assistance system according to claim 3, wherein
   the control device is configured to specify as the parking position the vehicle position when the remote-controlled parking function is activated before the start of the parking maneuver.

5. The parking assistance system according to claim 4, wherein
   the control device is configured not to define the vehicle position as a parking position when the remote-control parking function is activated before the start of the parking maneuver if a stored parking position is already present.

6. The parking assistance system according to claim 3, wherein the control device is configured to:
   detect that the vehicle has been moved without using the remote-controlled parking function, and
   reject the parking position in response thereto.

7. The parking assistance system according to claim 2, wherein the control device is configured to:
   decide that a parking situation is present:
      (i) when it is detected that there is a change in position with respect to the parking position in the forward direction and a selected forward-driving movement direction,
      or
      (ii) when it is detected that there is a change in position with respect to the parking position in the reverse direction and a selected reverse-driving movement direction; and
   decide that a parking-space-exiting situation is present:
      (i) when it is detected that there is a change in position with respect to the parking position in the forward direction and a selected reverse-driving movement direction, or
      (ii) when it is detected that there is a change in position with respect to the parking position in the reverse direction and a selected forward-driving movement direction.

8. The parking assistance system according to claim 7, wherein the control device is configured to:
   decide that a parking situation is present:
      (i) when it is detected that the vehicle is located in the front position region and there is a selected forward-driving movement direction, or (ii) when it is detected that the vehicle is located in a rear position region and there is a selected reverse-driving movement direction, and decide that a parking-space-exiting position is present:
(i) when it is detected that the vehicle is located in a front position region and there is a reverse-driving movement direction, or
(ii) when it is detected that the vehicle is located in a rear position region and there is a forward-driving movement direction.

9. The parking assistance system according to claim 2, wherein in order to detect the change in position, the control device is configured to detect:

whether the vehicle is currently located in a front position region, wherein a defined reference point of the vehicle lies, when viewed in the direction of the vehicle, in front of a discrimination straight line, or whether the vehicle is instead currently located in a rear position region, wherein the reference point lies, when viewed in the direction of the vehicle, behind the discrimination straight line, wherein the discrimination straight line runs through the position of the reference point in the parking position and is oriented transverse with respect to the vehicle orientation in the parking position.

10. The parking assistance system according to claim 1, wherein the control device is configured to:

detect a change in position of the vehicle with respect to a parking position of the vehicle in which the vehicle has been parked without using the remote-controlled parking function, and detect, on the basis of the detected change in position, whether there is a forward parking direction or a reverse parking direction.

11. The parking assistance system according to claim 10, wherein the control device is configured to:

search for the parking space or an object in front of the vehicle when a forward-parking direction is detected, and search for the parking space or an object behind the vehicle when a reverse-parking direction is detected.

12. The parking assistance system according to claim 1, wherein the control device is configured to:

park the vehicle in a steered fashion into the parking space when the presence of a parking situation is detected, and make the vehicle exit a parking space in an unsteered fashion when the presence of a parking-space-exiting maneuver is detected.

13. The parking assistance system according to claim 1, wherein the parking assistance system comprises a surroundings sensor system which is coupled to the control device and makes available surroundings information about the surroundings of the vehicle, and the control device is configured to:
detect the presence of a narrow point around the vehicle on the basis of surroundings information of the surroundings sensor system, and
decide as a function thereof that there is a parking-space-exiting situation.

14. The parking assistance system according to claim 13, wherein the parking space is a forward parking space, and the control device is configured to detect the presence of a narrow point on the basis of surroundings information about the presence of at least one obstacle to the side of the vehicle.

15. The parking assistance system according to claim 1, wherein the parking space is a forward parking space.

16. A parking method for automated parking of a motor vehicle in a parking space and exiting of the motor vehicle from a parking space, wherein depending on a position of the parking space, parking can be carried out in a forward parking direction or in a reverse parking direction, wherein the method comprises the steps of:

receiving a movement direction, selected at a user end, of the vehicle from outside the vehicle, wherein it is possible to receive as a selected movement direction:
(i) a forward-driving movement direction for driving the vehicle forward and
(ii) a reverse-driving movement direction for driving the vehicle in reverse, and without user-end specification about a presence of a parking situation or parking-space-exiting situation, deciding autonomously as to whether a parking situation or a parking-space-exiting situation is present, in response to deciding autonomously that the parking situation is present, parking the vehicle in accordance with the received selected movement direction by forward movement or reverse movement into the parking space, and in response to deciding autonomously that the parking-space-exiting situation is present, moving the vehicle out of the parking space in accordance with the received selected movement direction by forward movement or reverse movement out of the parking space.

\* \* \* \* \*